(12) United States Patent
Hayashi (10) Patent No.: US 11,937,155 B2
(45) Date of Patent: Mar. 19, 2024

(54) COMMUNICATION APPARATUS, INFORMATION PROCESSING METHOD AND SYSTEM

(71) Applicant: TOYOTA JIDOSHA KABUSHIKI KAISHA, Toyota (JP)

(72) Inventor: Kazushige Hayashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 484 days.

(21) Appl. No.: 17/206,401

(22) Filed: Mar. 19, 2021

(65) Prior Publication Data

US 2021/0300386 A1 Sep. 30, 2021

(30) Foreign Application Priority Data

Mar. 26, 2020 (JP) ................................ 2020-056531

(51) Int. Cl.
| | |
|---|---|
| H04W 4/40 | (2018.01) |
| G06F 16/9035 | (2019.01) |
| H04L 41/0816 | (2022.01) |
| H04W 4/20 | (2018.01) |
| H04W 4/50 | (2018.01) |
| H04W 8/20 | (2009.01) |
| H04W 40/20 | (2009.01) |

(52) U.S. Cl.
CPC .......... *H04W 4/40* (2018.02); *G06F 16/9035* (2019.01); *H04L 41/0816* (2013.01); *H04W 4/50* (2018.02); *H04W 8/205* (2013.01); *H04W 40/20* (2013.01)

(58) Field of Classification Search
CPC ......... H04W 4/40; H04W 4/50; H04W 4/021; H04W 4/44; H04W 8/205; H04W 40/20; G06F 16/9035; H04L 41/0816
See application file for complete search history.

(56) References Cited

U.S. PATENT DOCUMENTS

| | | | |
|---|---|---|---|
| 8,412,190 B1* | 4/2013 | Moisanen | H04W 36/0022 370/216 |
| 2011/0212746 A1* | 9/2011 | Sarkar | H04W 88/06 455/574 |
| 2013/0344864 A1* | 12/2013 | Park | H04W 8/18 455/432.3 |

(Continued)

FOREIGN PATENT DOCUMENTS

| | | |
|---|---|---|
| JP | 2017-63302 A | 3/2017 |
| JP | 2019-146097 A | 8/2019 |

(Continued)

*Primary Examiner* — Farid Seyedvosoghi
(74) *Attorney, Agent, or Firm* — Oblon, McClelland, Maier & Neustadt, L.L.P.

(57) ABSTRACT

A communication apparatus is a communication apparatus provided in a vehicle. A controller comprising at least one processor of the communication apparatus uses a first profile to receive a second profile to be used for communication in a predetermined area from a predetermined server apparatus in the predetermined area, the first profile being stored in a storage in advance and making it possible to receive the second profile from the predetermined server apparatus in the predetermined area. Then, the controller causes the second profile to be stored into the storage while the first profile is stored in the storage.

11 Claims, 4 Drawing Sheets

(56) References Cited

U.S. PATENT DOCUMENTS

| | | | |
|---|---|---|---|
| 2015/0215844 A1* | 7/2015 | Davis | H04W 8/183 |
| | | | 455/432.1 |
| 2016/0157085 A1 | 6/2016 | Yeoum et al. | |
| 2018/0109676 A1* | 4/2018 | Yeoum | H04M 3/42136 |
| 2020/0396592 A1 | 12/2020 | Okita et al. | |

FOREIGN PATENT DOCUMENTS

| | | | |
|---|---|---|---|
| JP | 2019-154071 A | | 9/2019 |
| JP | 2019-169900 A | | 10/2019 |
| JP | 2019169900 A | * | 10/2019 |

\* cited by examiner

COMMUNICATION APPARATUS, INFORMATION PROCESSING METHOD AND SYSTEM

CROSS REFERENCE TO THE RELATED APPLICATION

This application claims the benefit of Japanese Patent Application No. 2020-056531, filed on Mar. 26, 2020, which is hereby incorporated by reference herein in its entirety.

BACKGROUND

Technical Field

The present disclosure relates to a communication apparatus that receives a profile used for communication, an information processing method and a system.

Description of the Related Art

In patent literature 1 and patent literature 2, techniques about communication control apparatuses are disclosed. Each of the communication control apparatuses disclosed in patent literature 1 and patent literature 2 includes a storage that stores a condition for setting a profile for a communication apparatus to use for communication, and a reception unit that receives a signal from the communication apparatus and a profile setting unit that starts setting of a profile for the communication apparatus when a signal satisfies the condition stored in the storage. Furthermore, the communication control apparatus includes a trigger setting unit that disables the condition stored in the storage when the profile setting unit starts setting of a profile and enables the condition stored in the storage when the profile setting unit fails in setting of a profile.

Patent Literature 1: Japanese Patent Laid-Open No. 2019-154071
Patent Literature 2: Japanese Patent Laid-Open No. 2019-146097

SUMMARY

An object of the present disclosure is to provide a technique that makes it possible to, even when a communication apparatus receives a wrong profile, receive anew a correct profile for enabling the communication apparatus to perform communication.

A communication apparatus according to a first aspect of the present disclosure is a communication apparatus provided in a vehicle, the communication apparatus comprising a controller comprising at least one processor configured to:
  use a first profile to receive a second profile to be used for communication in a predetermined area from a predetermined server apparatus in the predetermined area, the first profile being stored in a storage in advance and making it possible to receive the second profile from the predetermined server apparatus in the predetermined area; and
  cause the second profile to be stored into the storage while the first profile is stored in the storage.

An information processing method according to a second aspect of the present disclosure is an information processing method executed by a communication apparatus provided in a vehicle, the information processing method comprising:
  using a first profile to receive a second profile to be used for communication in a predetermined area from a predetermined server apparatus in the predetermined area, the first profile being stored in a storage in advance and making it possible to receive the second profile from the predetermined server apparatus in the predetermined area; and
  causing the second profile to be stored into the storage while the first profile is stored in the storage.

A system according to a third aspect of the present disclosure is a system comprising a communication apparatus provided in a vehicle and a server apparatus, the communication apparatus configured to:
  use a first profile to receive a second profile to be used for communication in a predetermined area from the server apparatus in the predetermined area, the first profile being stored in a storage in advance and making it possible to receive the second profile from the server apparatus in the predetermined area; and
  cause the second profile to be stored into the storage while the first profile is stored in the storage.

According to the present disclosure, it becomes possible to, even when a communication apparatus receives a wrong profile, receive anew a correct profile for enabling the communication apparatus to perform communication.

DESCRIPTION OF THE EMBODIMENTS

A communication apparatus according to a first aspect of the present disclosure is a communication apparatus provided in a vehicle. A controller of the communication apparatus according to the first aspect of the present disclosure performs communication in a predetermined area using a second profile used for communication in the predetermined area. A storage of the communication apparatus stores a first profile making it possible to receive the second profile from a predetermined server apparatus in the predetermined area, in advance. The controller receives the second profile from the predetermined server apparatus in the predetermined area, using the first profile. Thereby, it becomes possible for the communication apparatus to perform communication in the predetermined area.

At this time, there may be a case where the second profile that the controller receives from the predetermined server apparatus is a wrong profile. If the second profile received from the predetermined server apparatus is wrong, the communication apparatus cannot perform communication in the predetermined area. Therefore, the controller needs to receive anew a correct second profile from the predetermined server apparatus to make it possible to perform communication in the predetermined area.

Here, it is assumed that, when receiving the second profile from the predetermined server apparatus, the controller rewrites the first profile with the second profile in the storage. In this case, since the first profile is deleted from the storage, it becomes impossible for the controller to use the first profile. Therefore, even if the second profile received from the predetermined server apparatus is wrong, the controller is disabled to receive anew the correct second profile from the predetermined server apparatus using the first profile. Further, since it is not possible to perform communication in the predetermined area with the wrong second profile stored in the storage, it also becomes impossible for the controller to receive the correct second profile from the predetermined server apparatus using the second profile.

Therefore, in the first aspect of the present disclosure, the controller causes the second profile to be stored into the storage while the first profile remains being stored in the storage. Thereby, it becomes possible for the controller to use the first profile again even after receiving the second profile from the predetermined server apparatus. Therefore, if the second profile received from the predetermined server apparatus is a wrong profile, the controller can receive anew the correct second profile from the predetermined server apparatus using the first profile in the predetermined area. Thus, it becomes possible to, even if the communication apparatus receives a wrong profile, receive anew a correct profile for enabling the communication apparatus to perform communication.

A specific embodiment of the present disclosure will be described below based on drawings. Sizes, materials and shapes of component parts described in the present embodiment, relative arrangement of the component parts, and the like are not intended to limit the technical scope of the present disclosure only thereto unless otherwise stated.

Embodiment (Outline of System)

Figure 1:
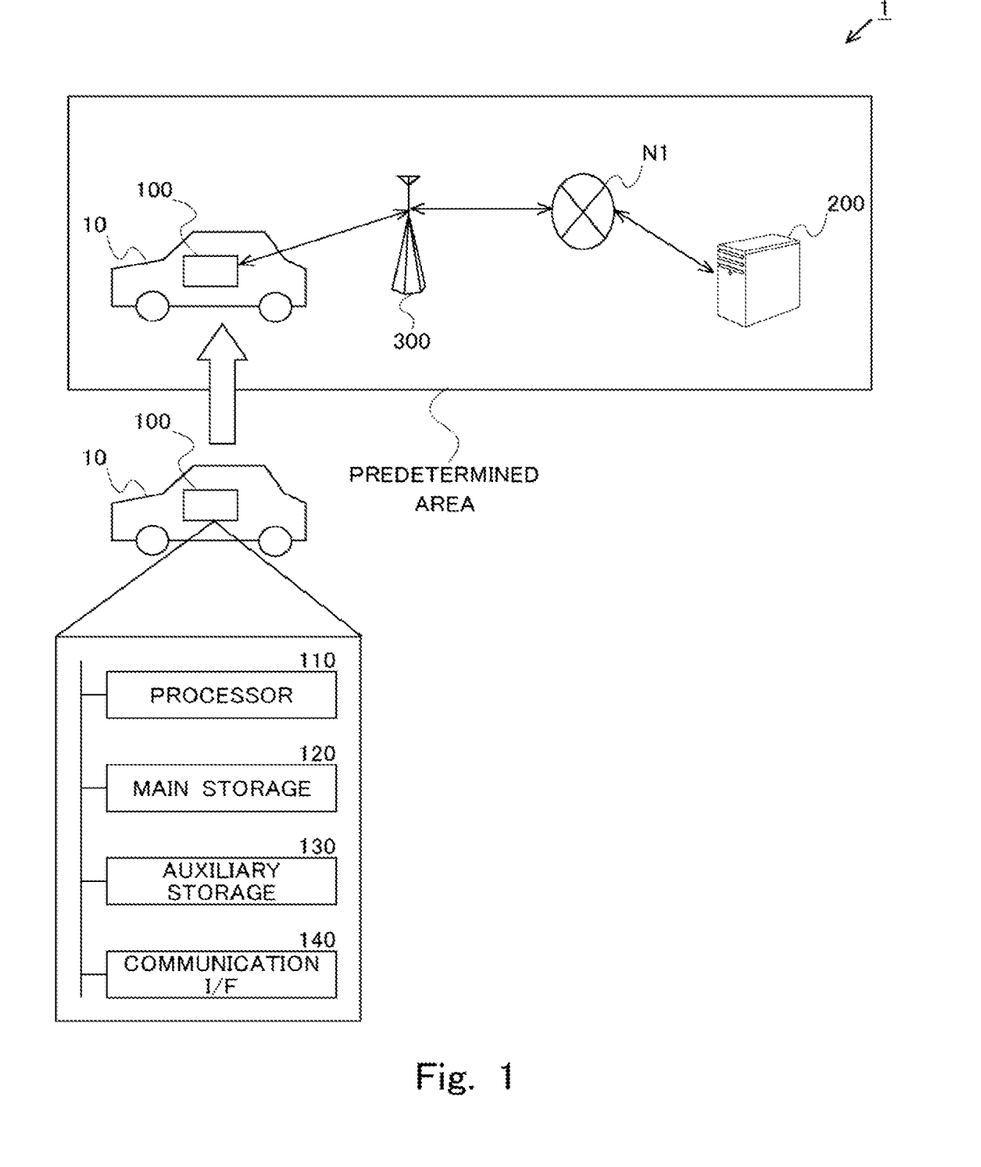
FIG. 1 is a diagram illustrating a schematic configuration of a communication system.

A communication system 1 in the present embodiment will be described based on FIG. 1. FIG. 1 is a diagram illustrating a schematic configuration of the communication system 1. The communication system 1 is configured, including a communication apparatus 100 provided in a vehicle 10, a management server 200 that manages communication of the communication apparatus 100 and a base station 300. In the communication system 1, the communication apparatus 100 and the management server 200 are mutually connected by a network N1. Here, as the network N1, a WAN (wide area network), which is a global communication network such as the Internet, can be exemplified as an example. The base station 300 relays communication between the network N1 and the communication apparatus 100 existing in a predetermined area. The communication apparatus 100 connects to the network N1 via the base station 300 installed in the predetermined area when the vehicle 10 (the communication apparatus 100) exists in the predetermined area. Note that, though the management server 200 exists in the predetermined area in FIG. 1, the management server 200 may exist outside the predetermined area.

The communication apparatus 100 is configured, including a computer having a processor 110, a main storage 120, an auxiliary storage 130 and a communication interface (a communication I/F) 140. The processor 110 is, for example, a CPU (central processing unit) or a DSP (digital signal processor). The main storage 120 is, for example, a RAM (random access memory). The auxiliary storage 130 is, for example, a ROM (read-only memory). The auxiliary storage 130 is, for example, an HDD (hard disk drive) or a disk recording medium like a CD-ROM, a DVD disk or a Blu-ray disk. Further, the auxiliary storage 130 may be a removable medium (a removable storage medium). Here, as the removable medium, for example, a USB memory or an SD card is exemplified. The communication I/F 140 is, for example, a wireless communication circuit for wireless communication.

In the communication apparatus 100, an operating system (OS), various kinds of programs, various kinds of information tables and the like are stored in the auxiliary storage 130. In the communication apparatus 100, various kinds of functions as described later can be realized by the processor 110 loading a program stored in the auxiliary storage 130 onto the main storage 120 and executing the program. However, a part or all of the functions of the communication apparatus 100 may be realized by a hardware circuit like an ASIC or an FPGA. Note that the communication apparatus 100 does not necessarily have to be realized by a single physical component but may be configured by a plurality of computers that cooperate with one another. Both of the management server 200 and the base station 300 are configured with computers, respectively, similarly to the communication apparatus 100.

The communication apparatus 100 performs communication using a profile for performing communication via the network N1 in the predetermined area (which may be hereinafter referred to as a "second profile"). Here, the profile includes information required for the communication apparatus 100 to use communication services provided by a communication operator, for example, TMST (international mobile subscriber identity) and the like. The communication apparatus 100 transmits the second profile to the base station 300 installed by the communication operator. At this time, by the base station 300 performing authentication based on the second profile received from the communication apparatus 100, the communication apparatus 100 is enabled to perform communication via the network N1 using the second profile.

Here, a case is assumed where the vehicle 10 moves into the predetermined area from the outside of the predetermined area as shown by a white arrow in FIG. 1. Note that the movement of the vehicle 10 at this time is not limited to traveling by the vehicle 10 itself but may be movement by the vehicle 10 being transported by other traffic methods. At this time, there may be a case where the vehicle 10 moves into the predetermined area in a state in which the second profile is not stored in the communication apparatus 100. In this case, however, the communication apparatus 100 stores a profile making it possible to receive the second profile from the management server 200 in the predetermined area (which may be referred to as a "first profile" hereinafter) in advance. Therefore, when the vehicle 10 moves into the predetermined area from the outside of the predetermined area, the communication apparatus 100 transmits the first profile to the base station 300. Then, by the first profile being authenticated by the base station 300, the communication apparatus 100 receives the second profile from the management server 200 via the network N1 in the predetermined area. Note that the management server 200 in the present embodiment corresponds to the "predetermined server apparatus" according to the present disclosure.

As described above, the first profile is a profile with which the communication apparatus 100 can receive the second profile from the management server 200 via the network N1 in the predetermined area. However, the first profile may be such a profile that, in the case of performing communication via the network N1 using the first profile in the predetermined area, the communication is restricted. Here, the communication restriction is that servers with which the communication apparatus 100 can communicate or information and the like that the communication apparatus 100 can transmit/receive are restricted. The first profile may be a profile with which communication via the network N1 cannot be performed except for receiving the second profile from the management server 200 in the predetermined area. As a method for restricting communication when the communication apparatus 100 connects to the network N1 using the first profile in the predetermined area as described above, a publicly known method can be adopted. For example, for the communication apparatus 100 that has transmitted the first profile to the base station 300, the base station 300 may restrict servers to which the communication apparatus 100 can connect or information and the like that the communication apparatus 100 can transmit/receive on the network N1.

Further, the first profile may be, for example, a profile with which the communication apparatus 100 can perform communication via the network N1 in a certain area outside the predetermined area. In that case, the first profile may include a profile for receiving the second profile from the management server 200 in the predetermined area in addition to the profile for the communication apparatus 100 to perform communication in the certain area outside the predetermined area. Further, the first profile may be such a profile that it is permitted in advance by the communication operator to receive the second profile from the management server 200 via the network N1 using the first profile in the predetermined area.

(System Configuration)

Figure 2:
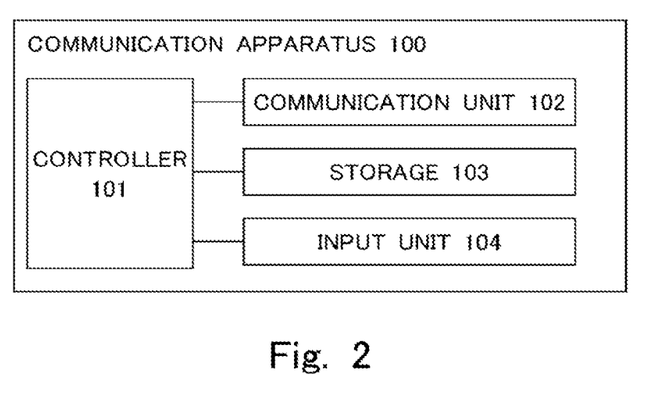
FIG. 2 is a block diagram schematically illustrating an example of a functional configuration of a communication apparatus.

Next, a functional configuration of the communication apparatus 100 constituting the communication system 1 according to the present embodiment will be described based on FIG. 2. FIG. 2 is a block diagram schematically illustrating an example of the functional configuration of the communication apparatus 100. The communication apparatus 100 is configured, including a controller 101, a communication unit 102, a storage 103 and an input unit 104. The controller 101 has a function of performing arithmetic processing for controlling the communication apparatus 100. The controller 101 can be realized by the processor 110.

The communication unit 102 has a function of connecting the communication apparatus 100 to the network N1. The communication unit 102 can be realized by the communication I/F 140. The communication unit 102 can communicate with the management server 200 via the network N1 using a mobile communication service, for example, 3G (3rd generation), LTE (Long Term Evolution) or the like. Further, the communication unit 102 may communicate with a server different from the management server 200 via the network N1.

The storage 103 has a function of storing profiles. The storage 103 is configured, for example, with an eSIM (embedded-SIM). The storage 103 can be realized by the auxiliary storage 130. The storage 103 can store at least two profiles. Further, the storage 103 stores the first profile in advance.

The input unit 104 has a function of accepting an operation on the communication apparatus 100 by a user of the vehicle 10 provided with the communication apparatus 100. Here, as the user of the vehicle 10, an owner, a seller, a repairman and the like of the vehicle 10 (the communication apparatus 100) can be exemplified as examples. The input unit 104 is configured with push buttons, a keyboard, a touch panel or the like. Note that the input unit 104 may be provided in the vehicle 10. For example, the input unit 104 may be provided on a car navigation system or the like provided in the vehicle 10. The input unit 104 transmits reception instruction information for causing the controller 101 to receive the second profile from the management server 200, to the controller 101 based on an operation by the user of the vehicle 10. Further, the input unit 104 transmits switching information for causing the controller 101 to switch between communication using the first profile and communication using the second profile, to the controller 101 based on an operation by the user of the vehicle 10.

(Second Profile)

As described above, when the vehicle 10 moves into the predetermined area from the outside of the predetermined area, the communication apparatus 100 receives the second profile from the management server 200. At this time, there may be a case where the second profile received from the management server 200 is a wrong profile. Here, as a cause of the second profile being a wrong file, it can be exemplified as an example that the communication operator registers a profile with wrong content with the management server 200 as the second profile. Then, it becomes impossible for the communication apparatus 100 that receives the wrong second profile to perform communication via the network N1 using the second profile in the predetermined area. Therefore, when the second profile received from the management server 200 is a wrong profile, the communication apparatus 100 needs to receive anew a correct second profile in order to perform communication via the network N1 in the predetermined area.

Here, it is assumed that, when receiving the second profile from the management server 200, the communication apparatus 100 rewrites the first profile with the second profile in the storage 103. In other words, it is assumed that the first profile stored in the storage 103 in advance is deleted, and the second profile received from the management server 200 is stored into the storage 103. It is assumed that, at this time, the second profile received from the management server 200 is a wrong profile. Then, since the first profile has been already deleted from the storage 103, it becomes impossible for the communication apparatus 100 to receive anew the correct second profile from the management server 200 using the first profile. Further, since it is not possible to perform communication via the network N1 with the wrong second profile, it also becomes impossible for the communication apparatus 100 to receive the correct second profile from the management server 200 using the second profile.

Therefore, when receiving the second profile from the management server 200, the communication apparatus 100 in the present embodiment stores the second profile while the first profile is remains being stored in the storage 103. Thereby, it is possible to, even if the second profile received from the management server 200 is a wrong file, receive anew the correct second profile from the management server 200 using the first profile.

(Flow of Communication Start Process)

Figure 3:
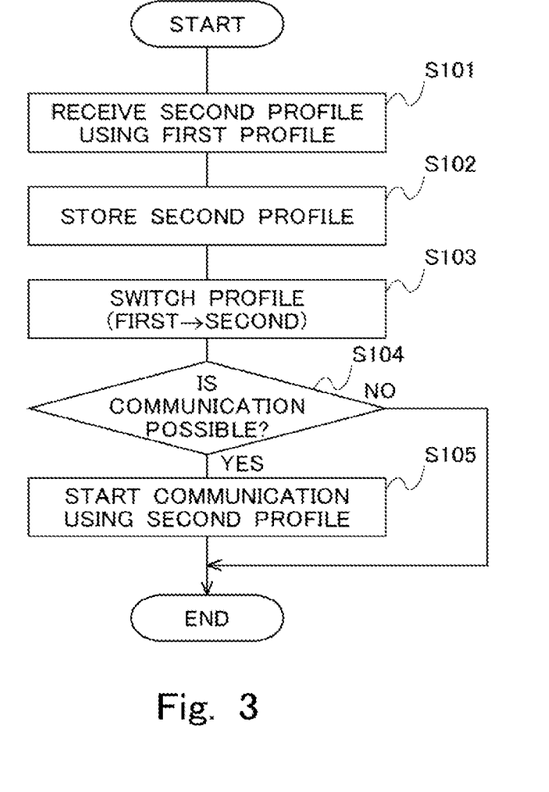
FIG. 3 is a flowchart of a communication start process.

A communication start process executed by the controller 101 in the communication system 1 will be described based on FIG. 3. FIG. 3 is a flowchart of the communication start process. The communication start process is a process for the controller 101 to receive the second profile from the management server 200 and start communication using the second profile. Further, the communication start process is a process executed when the vehicle 10 exists in the predetermined area, and is started when the controller 101 receives reception instruction information from the input unit 104. The communication start process may be started when the controller 101 detects that the vehicle 10 (the communication apparatus 100) exists in the predetermined area.

In the communication start process, the first profile is transmitted to the base station 300 at S101 first. Then, the second profile is received from the management server 200 via the network N1, using the first profile. Next, at S102, the second profile is stored into the storage 103 while the first profile stored in the storage 103 remains being stored in the storage 103. Next, at S103, a profile to be used for communication is switched from the first profile to the second profile. Here, at S103, the process may be started when the controller 101 receives information about switching from the first profile to the second profile, from the input unit 104. Then, at S104, it is determined whether it is possible or not to perform communication via the network N1 using the second profile. Here, as a method for determining whether it is possible or not to perform communication via the network N1 using the second profile, a publicly known method can be adopted. For example, the controller 101 actually tries communication via the network N1 using the second profile, and the determination may be performed based on whether it was possible or not to perform the communication.

When a positive determination is made at S104, it can be said that the controller 101 has received the correct second profile from the management server 200. In this case, at S105, communication via the network N1 using the second profile is started. Then, the communication start process is ended. On the other hand, when a negative determination is made at S104, the controller 101 cannot perform communication via the network N1 using the second profile. Therefore, without communication via the network N1 using the second profile being started, the communication start process is ended.

(Flow of Re-Reception Process)

Figure 4:
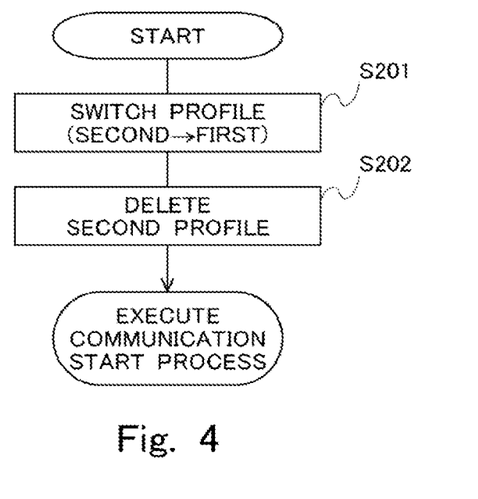
FIG. 4 is a flowchart of a re-reception process.

Next, a re-reception process executed by the controller 101 in the communication apparatus 100 in the communication system 1 according to the present embodiment will be described based on FIG. 4. FIG. 4 is a flowchart of the re-reception process. The re-reception process is a process for the communication apparatus 100 to receive anew the second profile using the first profile and start communication using the second profile. The re-reception process is started when the controller 101 receives switching information from the input unit 104 after a negative determination is made at S104 in the communication start process. Here, as a timing when the user performs an operation for transmitting the switching information to the controller 101 on the input unit 104, time when the communication operator modifies the wrong second profile in the management server 200 to the correct second profile can be exemplified as an example.

In the re-reception process, the profile to be used for communication is switched from the second profile to the first profile at S201 first. Furthermore, at S202, the wrong second profile is deleted from the storage 103. Here, the order of S201 and S202 may be reversed. As described above, when the controller 101 receives the switching information generated by the user operating the input unit 104, the wrong second profile is deleted from the storage 103. Thus, when the storage 103 has a data capacity capable of storing two profiles, it becomes possible to, by the wrong second profile being deleted from the storage 103, cause the second profile to be newly stored into the storage 103. When the storage 103 has a data capacity capable of storing three or more profiles, it is possible to suppress insufficiency of the data capacity of the storage 103. Note that, when no communication is possible via the network N1 using the second profile received from the management server 200 (that is, when a negative determination is made at S104) in the communication start process illustrated in FIG. 3, the second profile may be deleted from the storage 103 at that time point. In this case, the process of S202 is omitted in the re-reception process.

When the process of S202 is completed, the communication start process illustrated in FIG. 3 is executed again. Thereby, when the second profile received from the management server 200 has been modified to a correct profile, communication via the network N1 using the second profile is started.

As described above, when no communication is possible using the second profile received from the management server 200, the controller 101 switches the profile to be used for communication from the second profile to the first profile that remains being stored in the storage 103. Thereby, even if the controller 101 has received the wrong second profile, the controller 101 is enabled to receive the correct second profile using the first profile. Thereby, it becomes possible to, even if the communication apparatus 100 receives anew the wrong second profile, receive anew the correct second profile for enabling the communication apparatus 100 to perform communication in the predetermined area.

<Modification>

When no communication is possible via the network N1 using the second profile, the controller 101 may perform profile switching. In this case, when a negative determination is made at S104 illustrated in FIG. 3, processes at S201 and S202 are executed. Then, after the communication start process ends, the communication start process is executed again by the user performing an operation for transmitting the reception instruction information to the controller 101 on the input unit 104. Here, as a timing when the user performs an operation for transmitting the reception instruction information to the controller 101 on the input unit 104, time when the communication operator modifies the wrong second profile in the management server 200 to the correct second profile can be exemplified as an example.

At this time, until the user performs the operation for transmitting the reception instruction information to the controller 101 on the input unit 104, and the communication start process is executed, the controller 101 performs communication via the network N1 using the first profile. It is assumed that, at this time, the first profile is such a profile that, in the case of performing communication via the network N1 using the first profile in the predetermined area, the communication is restricted. Then, the controller 101 can perform communication via the network N1 even within a range of restricted communication until the communication start process is executed. Thereby, the controller 101 can perform communication via the network N1 within the range of the restricted communication using the first profile until the wrong second profile in the management server 200 is modified to the correct second profile by the communication operator.

OTHER EMBODIMENTS

The embodiment described above is a mere example, and the present disclosure can be appropriately changed within a range not departing from the spirit thereof and implemented. The processes and means described in the present disclosure can be freely combined and implemented as far as technical contradiction does not occur.

Further, a process described as being performed by one apparatus may be shared and executed by a plurality of apparatuses. A process described as being performed by different apparatuses may be executed by one apparatus. In a computer system, by what hardware configuration (server configuration) each function is realized can be flexibly changed.

The present disclosure can be realized by supplying a computer program in which the functions described in the above embodiment are implemented to a computer, and one or more processors that the computer has reading out and executing the program. Such a computer program may be provided to the computer by a non-transitory computer-readable storage medium that can be connected to a system bus of the computer or may be provided to the computer via a network. As the non-transitory computer-readable storage medium, for example, a disk of an arbitrary type such as a magnetic disk (including a floppy (R) disk, a hard disk drive (HDD) or the like) and an optical disk (including a CD-ROM, a DVD disk, a Blu-ray disk or the like), and any type of medium that is appropriate for storing electronic instructions like a read-only memory (ROM), a random access memory (RAM), an EPROM, an EEPROM, a magnetic card, a flash memory or an optical card are included.

What is claimed is:

1. A communication apparatus provided in a vehicle, the communication apparatus comprising a controller comprising at least one processor configured to:

use a first profile to receive a second profile to be used for communication in a predetermined area from a predetermined server apparatus in the predetermined area, the first profile being stored in a storage in advance, the first profile being subject to restrictions on communication within the predetermined area, and the first profile being used to receive the second profile from the predetermined server apparatus in the predetermined area;

cause the second profile to be stored into the storage while the first profile is stored in the storage;

determine whether or not communication can be performed using the second profile stored in the storage;

when communication cannot be performed using the second profile, switch the profile used for communication from the second profile to the first profile based on a first operation by the user of the vehicle;

until a second operation by the user is performed, communicate using the first profile in the predetermined area; and when the second operation is received, receive the second profile from the predetermined server apparatus in the predetermined region, using the first profile.

2. The communication apparatus according to claim 1, wherein no communication is possible in the predetermined area under the communication restriction, except for receiving the second profile from the predetermined server apparatus in the predetermined area.

3. The communication apparatus according to claim 1, wherein, when no communication is possible using the second profile, the controller is configured to delete the second profile from the storage.

4. The communication apparatus according to claim 1, wherein, when the first operation by the user is performed, the controller is configured to delete the second profile from the storage.

5. The communication apparatus according to claim 1, wherein the first operation by the user is performed on an input unit provided in the vehicle.

6. An information processing method executed by a communication apparatus provided in a vehicle, the information processing method comprising:

using a first profile to receive a second profile to be used for communication in a predetermined area from a predetermined server apparatus in the predetermined area, the first profile being stored in a storage in advance, the first profile being subject to restrictions on communication within the predetermined area, and the first profile being used to receive the second profile from the predetermined server apparatus in the predetermined area;

causing the second profile to be stored into the storage while the first profile is stored in the storage;

determining whether or not communication can be performed using the second profile stored in the storage;

when communication cannot be performed using the second profile, switching the profile used for communication from the second profile to the first profile based on a first operation by the user of the vehicle;

until a second operation by the user is performed, communicating using the first profile in the predetermined area; and when the second operation is received, receiving the second profile from the predetermined server apparatus in the predetermined region, using the first profile.

7. The information processing method according to claim 6, wherein no communication is possible in the predetermined area under the communication restriction, except for receiving the second profile from the predetermined server apparatus in the predetermined area.

8. The information processing method according to claim 6, wherein, when no communication is possible using the second profile, the second profile is deleted from the storage.

9. The information processing method according to claim 6, wherein, when the first operation by the user is performed, the second profile is deleted from the storage.

10. A system comprising a communication apparatus provided in a vehicle and a server apparatus, the communication apparatus configured to:

use a first profile to receive a second profile to be used for communication in a predetermined area from the server apparatus in the predetermined area, the first profile being stored in a storage in advance, the first profile being subject to restrictions on communication within the predetermined area, and the first profile being used to receive the second profile from the server apparatus in the predetermined area;

cause the second profile to be stored into the storage while the first profile is stored in the storage;

determine whether or not communication can be performed using the second profile stored in the storage;

when communication cannot be performed using the second profile, switch the profile used for communication from the second profile to the first profile based on a first operation by the user of the vehicle;

until a second operation by the user is performed, communicate using the first profile in the predetermined area; and when the second operation is received, receive the second profile from the predetermined server apparatus in the predetermined region, using the first profile.

11. The system according to claim 10, wherein no communication is possible in the predetermined area under the communication restriction, except for receiving the second profile from the server apparatus in the predetermined area.

* * * * *